United States Patent [19]

Yasuda et al.

[11] Patent Number: 4,501,805
[45] Date of Patent: Feb. 26, 1985

[54] GALVANIC CELL HAVING A SATURATED FLUOROCARBON PLASMA-TREATED SEALING GASKET

[75] Inventors: Hirotsugu Yasuda, Newburg, Mo.; Johannes A. van Lier, Euclid, Ohio

[73] Assignee: Union Carbide Corporation, Danbury, Conn.

[21] Appl. No.: 564,250

[22] Filed: Dec. 22, 1983

[51] Int. Cl.$^3$ ............................................. H01M 2/08
[52] U.S. Cl. ..................................... 429/174; 429/185
[58] Field of Search ............... 429/174, 185, 171, 172; 427/39

[56] References Cited

FOREIGN PATENT DOCUMENTS 90146 7/1978 Japan .

OTHER PUBLICATIONS

Kirk–Othmer, *Encyclopedia of Chemical Technology*, vol. 10, pp. 262–265.
E. Kay and A. Dilks, *Plasma Polymerization of Fluorocarbons in rf Capacitively Coupled Diode Systems*, J. Vac. Sci. Technol., 18 (1), Jan./Feb. 1918, pp. 1–11.

*Primary Examiner*—Anthony Skapars
*Attorney, Agent, or Firm*—William E. Dickheiser

[57] ABSTRACT

Galvanic cells employing compressible gaskets having at least a portion of the sealing areas of such gaskets coated with plasma deposited fluorine atoms demonstrate increased resistance to electrolyte leakage.

2 Claims, 2 Drawing Figures

GALVANIC CELL HAVING A SATURATED FLUOROCARBON PLASMA-TREATED SEALING GASKET

FIELD OF THE INVENTION

This invention relates to a sealed galvanic cell having a sealing gasket wherein at least a portion of at least one of the sealing areas of said sealing gasket has plasma-deposited fluorine atoms on its surface, thereby providing such cell with increased resistance to electrolyte leakage. In another aspect this invention is directed to a process for treating at least a portion of at least one of the sealing areas of a compressible gasket which is to be employed in a sealed galvanic cell, which process comprises treating said at least one sealing area with saturated fluorocarbon plasma in order to deposit fluorine on the surface of such sealing area, thereby increasing the electrolyte repellency of such sealing areas.

BACKGROUND OF THE INVENTION

A continuing concern of the manufacture of galvanic cells is that electrolyte may creep through a sealed interface of the cell and leak out of the cell. Electrolyte leakage can shorten cell life and can also cause a corrosive deposit to form on the exterior surface of the cell which detracts from the cell's appearance and marketability. These corrosive salts may also damage the device in which the cell is housed. Electrolyte leakage occurs in cell systems having aqueous or nonaqueous electrolytes, such as organic solvent-based electrolytes and liquid inorganic cathode-electrolytes, for example those based on thionyl chloride and sulfuryl chloride. Electrolytes such as alkaline electrolytes have an affinity for wetting metal surfaces and are known to creep through a sealed interface of a galvanic cell.

In the prior art it has been a conventional practice to incorporate an insulating gasket between the cell container and cover so as to provide a seal for the cell. Generally, the gasket must be made of a material inert to the electrolyte contained in the cell and the cell environment. In addition, it has to be sufficiently flexible and resistant to cold flow under pressure of the seal and to be able to maintain these characteristics so as to insure a proper seal during long periods of storage.

It has been recognized in the prior art that gaskets having fluorine atoms on their surface are more effective in preventing electrolyte creepage. However, while materials such as polytetrafluoroethylene and ethylene-tetrafluoroethylene copolymer have been employed in cell gaskets, these compounds do not possess as desirable a resistance to cold flow under pressure as do other gasket materials such as nylon, polypropylene and the like. Cold flow is defined as the distortion of a solid under sustained pressure with an accompanying inability to return to its original dimensions when the pressure is removed. The cold flow for a given thermoplastic material is related to such thermoplastic material's apparent flexural modulus. The greater the modulus at a constant stress, the lesser the elongation and, in reference to compressive loads, the lesser the tendency to relax while under load at a specific temperature. The apparent flexural modulus for materials such as nylon, polypropylene and high density polyethylene is substantially greater than for materials such as ethylene-tetrafluoroethylene copolymer and polytetrafluoroethylene.

Based on such apparent flexural moduli, it is apparent that nylon will have less of a tendency to relax in compression than will polytetrafluoroethylene and ethylene-polytetrafluoroethylene copolymer. Consequently, nylon and similiar materials such as polypropylene will provide more effective seals than will fluoropolymer gaskets. Moreover, such fluoropolymers are relatively expensive and thus are undesirable from a commercial standpoint.

Thus, it would be desirable to provide a cell having a seal which possesses the electrolyte-creepage resistance of fluoropolymers coupled with the superior effective sealing ability of nylon and polypropylene gaskets.

Japanese Patent Application 90146/1978 discloses the formation of a fluoropolymer film by sputtering or plasma deposition onto the surface of electrochemical cells in order to reduce electrolyte leakage. However, this application is directed to the deposition of a polymeric layer of fluoropolymer material on such surfaces as it indicates that the thickness of the film deposited should be at least 3000 Angstroms in order to avoid pinholes.

It is known in the art of plasma deposition of saturated fluorocarbon materials that hydrogen gas must be incorporated into the plasma reaction mixture along with the saturated fluorocarbon compound in order for a polymeric layer of the thickness of more than 3000 Angstroms to be deposited in a reasonable time frame. As is noted by E. Kay and A. Dilks, *Plasma polymerization of fluorocarbons in rf capacitively coupled diode system*, J. Vac. Sci. Technol., 18(1), Jan./Feb. 1981 at page 9, "Hydrogen will scavenge F atoms and tie them up as relatively stable HF thereby reducing the $F/(CF_2)_n$ ratio and pushing the plasma in the direction of polymerization ... " Thus, it is evident to one skilled in the art that Japanese Patent Application 90146/1978 would require plasma treatment with a fluorocarbon/hydrogen mixture in order to deposit such a polymeric layer.

It is noteworthy that as polymeric films, such as those deposited in Japanese Application 90146/1978, become thicker they tend to become more brittle so as to cause cohesive failure when subjected to cell sealing forces. Consequently, it would be desirable if the sealing surfaces of a cell could be treated so as to provide the electrolyte repellence of such fluoropolymeric layers accompanied by enhanced adhesion to the sealing surface.

It is therefore an object of this invention to provide a galvanic cell wherein at least a portion of the sealing surfaces of the gasket exhibit the increased electrolyte repellence associated with surfacial fluorine atoms.

It is a further object of this invention to provide a galvanic cell employing a sealing gasket having desirable resistance to cold flow which cell exhibits increased resistance electrolyte leakage.

It is further object of this invention to provide a process for treating at least a portion of at least one sealing surface of a galvanic cell's compressible gasket such that the assembled cell will demonstrate increased resistance to electrolyte leakage.

The foregoing and additional objects of this invention will become apparent from the following description and accompanying drawings and examples.

DESCRIPTION OF THE INVENTION

This invention relates to a sealed galvanic cell comprising a cathodic material, an anodic material, and an electrolyte housed in a container having an open end, said container being sealed at such open end by a cover with a non-conductive gasket compressively disposed therebetween, said gasket having a first gasket sealing surface and a second gasket sealing surface, said first gasket sealing surface and said second gasket sealing surface being in interfacial sealing contact with said container and said cover respectively; characterized in that at least a portion of at least one of the first gasket sealing surface and the second gasket sealing surface has plasma-deposited fluorine atoms bound thereto such that said cell exhibits increased resistance to electrolyte leakage.

In yet another aspect, this invention relates to a process for treating a compressible gasket to be assembled into a galvanic cell such that the assembled cell will exhibit increased resistance to electrolyte leakage comprising the steps:

(a) providing a compressible gasket having a portion which is adapted to function as a sealing surface: and (b) exposing at least a portion of said portion of the compressible gasket which is adapted to function as a sealing surface to a saturated fluorocarbon plasma until fluorine atoms are bound to said portion of said portion.

As it is employed herein the term "sealing surface" refers to a portion of a member of the cell's housing which portion is adapted to be compressively disposed opposite a portion of a second member of the cell's housing such that a seal is formed at the interface of such portions. As is employed herein the term "cathodic material" encompasses solid, liquid and gaseous cathodes as well as materials adapted to serve as conductive substrates for gases such as are employed in air-depolarized cells.

The process of plasma deposition or glow-discharge deposition is known in the art and is described in Kirk-Othmer, *Encyclopedia of Chemical Technology,* Volume 10 at pages 262–265, John Wiley & Sons (3d Ed. 1980). In plasma deposition, a substance in the vapor phase is excited to luminescence by an electric discharge, and, typically, a solid film is deposited on surfaces exposed to the luminous plasma. As is discussed above, plasma treatment with a saturated fluoropolymer mixed with hydrogen (as is presumably employed in Japanese Application 90146/1978) will produce a layer of polymeric material on the surface of the substrate. The longer such plasma treatment lasts the thicker the polymeric layer deposited.

However, it has been unexpectedly found that plasma treatment with saturated fluoropolymer alone will provide a cell sealing surface with enhanced electrolyte repellency. This result is unexpected as treatment with a saturated fluorocarbon plasma alone will generally result in the deposition of only a monolayer of fluorine atoms on the substrate surface, whereas Japanese Application 90146/1978 requires a fluoropolymeric layer of more than 3000 Angstroms in thickness in order to achieve a similar result. Because only a thin layer of fluorine atoms is deposited on at least a portion of the gasket sealing surfaces of the cells of this invention, such layer is much more resistant to cracking or peeling when subjected to the pressures of cell assembly than are thicker fluoropolymeric layers.

Representative of the saturated fluorocarbon materials which may be employed to coat at least a portion of the cell sealing surfaces of the cells of this invention are tetrafluoromethane, hexafluoroethane, octafluoropropane, n-decafluorobutane and iso-decafluorobutane.

The housing of the cells of this invention is comprised of a cover, container and sealing gasket. The cell cover and container of the cells of this invention are typically composed of metals such as nickel, steel, copper, copper-clad steel, monel (an alloy of copper and nickel), brass, nickel-plated steel and the like. The nonconductive gaskets of this invention are typically composed of materials which exhibit good resistance to cold flow, such as nylon, polypropylene, high density polyethylene and the like.

The plasma treatment of this invention is typically carried out as follows. The gasket sealing surfaces may be prepared for fluorocarbon plasma treatment by appropriate gas plasma treatment. The fluorocarbon compound to be employed is then introduced into the reactor and plasma treatment initiated. If desired, areas of the housing member may be masked so that only the desired portion of such housing member is coated.

BRIEF DESCRIPTION OF THE DRAWINGS

The present invention will become more apparent from the following description thereof when considered together with the accompanying drawing which is set forth as being exemplary of an embodiment of the present invention and is not intended in any way to be limitative thereof and wherein.

DETAILED DESCRIPTION OF THE DRAWINGS

Figure 1:
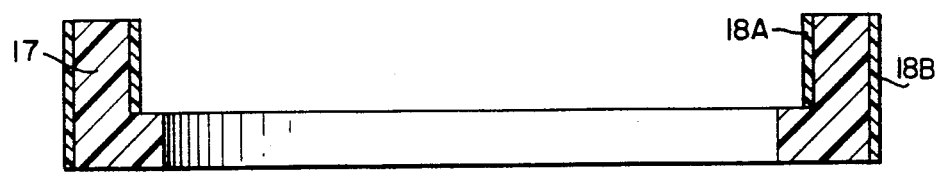
FIG. 1 is a cross-sectional view of a sealing gasket wherein a portion of the sealing surface of such gasket has been treated with a saturated fluorocarbon plasma.

Referring now to FIG. 1 there is shown a cross-sectional view of a sealing gasket 16, having a portion of the first and second gasket sealing surfaces coated with a thin layer of plasma deposited fluorine atoms, 18B and 18A respectively.

Figure 2:
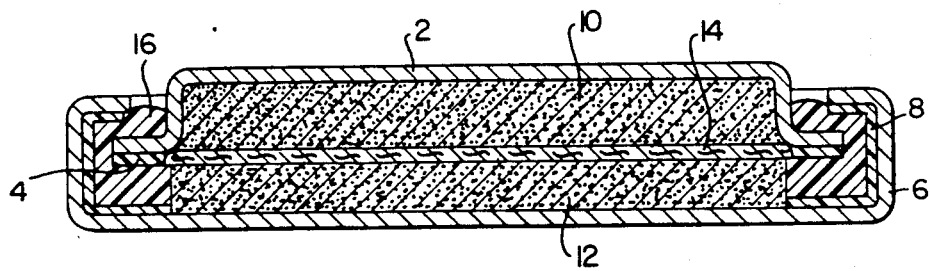
FIG. 2 is a cross-sectional view of an assembled cell employing a saturated fluorocarbon plasma-treated gasket.

FIG. 2 shows an assembled miniature cell having a housing comprised of cover 2 and container 6. Compressively disposed between cover 2 and container 6 is compressible sealing gasket 16. The sealing surface of container 6 is disposed in interfacial sealing contact with the first gasket sealing surface of gasket 16 while the sealing surface of cover 2 is disposed in interfacial sealing contact with the second gasket sealing surface of gasket 16. The first gasket sealing surface has layer of fluorine atoms 8 bonded to its surface and a portion of the second gasket sealing surface has layer of fluorine atoms 4 bonded to its surface. Disposed within cover 2 and in electrical contact therewith is anode 10, thereby adapting cover 2 as the anodic or negative terminal of the cell. Disposed within container 6 and in electrical contact therewith is cathode 12, thereby adapting container 6 as the cathodic or positive terminal of the cell. Anode 10 is separated from cathode 12 by separator 14.

EXAMPLES

The following Examples are intended to further illustrate the invention and are not intended to limit the scope of the invention in any manner.

EXAMPLE 1

Several nylon film sheets were treated with hexafluoroethane plasma utilizing a capacitatively coupled bell jar plasma treatment reactor system having copper electrodes. A frequency of 10 KHz was employed. The samples were mounted on a moving plate which rotated 50 times per minute so that the substrate passed between the electrodes on each rotational cycle thereby ensuring a uniform plasma treatment. Fluorine deposition was carried out at a power of 15–30 watts utilizing a gas flow rate of 3–5 cc (STP)/min. The nylon sheets were treated for the time periods indicated in Table 1 below.

The water contact angle for nylon sheets which had been treated for various lengths of time is shown in Table 1 below. The contact angle is that angle which is included inside a liquid (when a liquid and a solid meet along same line) between the tangent plane to the surface of the liquid and a tangent plane to the surface of the solid at any point of the curve of contact. The higher the water contact angle the more resistance to water creepage a surface will demonstrate.

TABLE 1

Contact angles of nylon film sheets before and after fluorine plasma treatment

| Treating Time (seconds) | Contact Angle (degrees) |
| --- | --- |
| Control (O) | 70 |
| 10 | 102 |
| 20 | 105 |
| 30 | 106 |
| 60 | 105 |
| 90 | 106.5 |
| 120 | 107 |
| 150 | 106 |

The above results indicate that nylon film sheets treated with fluoride plasma are more resistant to wetting. Thus nylon gaskets which have been so treated will be more resistant to aqueous electrolyte creepage.

EXAMPLE 2

Several lots of miniature $Zn/Ag_2O$ cells employing a potassium hydroxide electrolyte, each cell measuring about 0.31 inch (about 0.79 cm) in diameter and about 0.14 inch (about 0.36 cm) in height, were constructed. Several lots (cell Sample A) employed untreated nylon gaskets. Other lots (cell Sample B) employed gaskets which had been coated with a fatty polyamide in accordance with U.S. Pat. No. 3,922,178. Still other lots (cell Sample C) employed gaskets which had been treated with hexafluoroethane plasma in accordance with this invention followed by polyamide coating.

The cells so produced were stored for nine weeks at 90% relative humidity and elevated temperature (45° C.). The positive terminal leakage of such cells is indicated in Table 2 below.

TABLE 2

Positive Terminal Leakage Characteristics After 9 Weeks at 45° C., 90% R.H.

| Cell Sample | No Cells Inspected | No Cells Showing Leakage | % Salt |
| --- | --- | --- | --- |
| A | 30 | 27 | 90 |
| B | 44 | 39 | 89 |
| C | 30 | 8 | 27 |

The above results indicate that using the saturated fluorocarbon plasma treatment of this invention, a substantial reduction in leakage was obtained.

What is claimed is:

1. A sealed galvanic cell comprising a cathodic material, an anodic material, and an electrolyte housed in a container having an open end, said container being sealed at its open end by a cover with a non-conductive gasket compressively disposed between said cover and said container, said gasket having a first gasket sealing surface and a second gasket sealing surface, said first gasket sealing surface and said second gasket sealing surface being in interfacial sealing contact with said container and said cover respectively, characterized in that at least a portion of at least one of the first gasket sealing surface and the second gasket sealing surface has only a monolayer of plasma-deposited fluorine atoms bound thereto such that said cell exhibits increased resistance to electrolyte leakage.

2. The galvanic cell of claim 1 wherein said sealing gasket is composed of a material selected from the group consisting of nylon, polypropylene and high density polyethylene.

* * * * *